May 30, 1933.   L. R. JACKSON   1,911,319
REFRIGERATING APPARATUS
Filed May 18, 1932    4 Sheets-Sheet 1
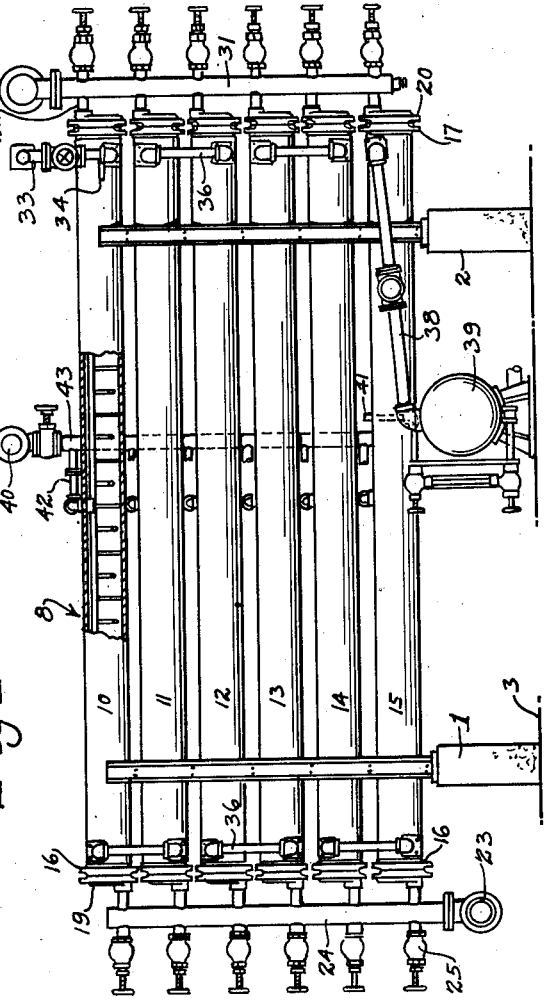
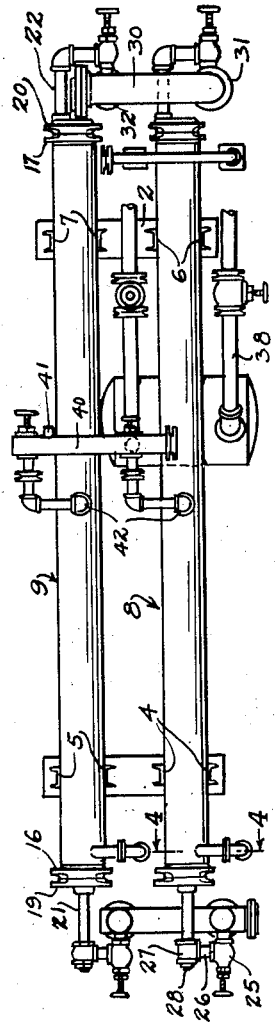
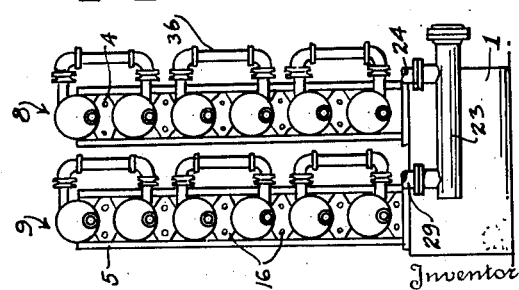
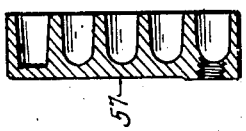
LEWIS R. JACKSON May 30, 1933.   L. R. JACKSON   1,911,319
REFRIGERATING APPARATUS
Filed May 18, 1932   4 Sheets-Sheet 2

Inventor
LEWIS R. JACKSON
By Mason Fenwick Lawrence
Attorneys

May 30, 1933.　　　L. R. JACKSON　　　1,911,319
REFRIGERATING APPARATUS
Filed May 18, 1932　　　4 Sheets-Sheet 3
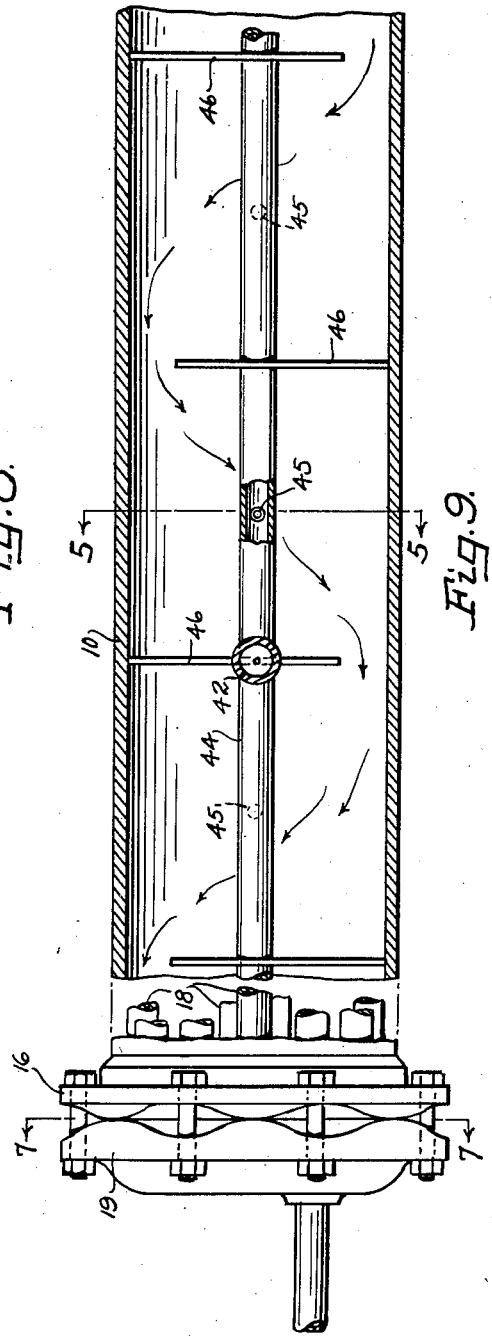
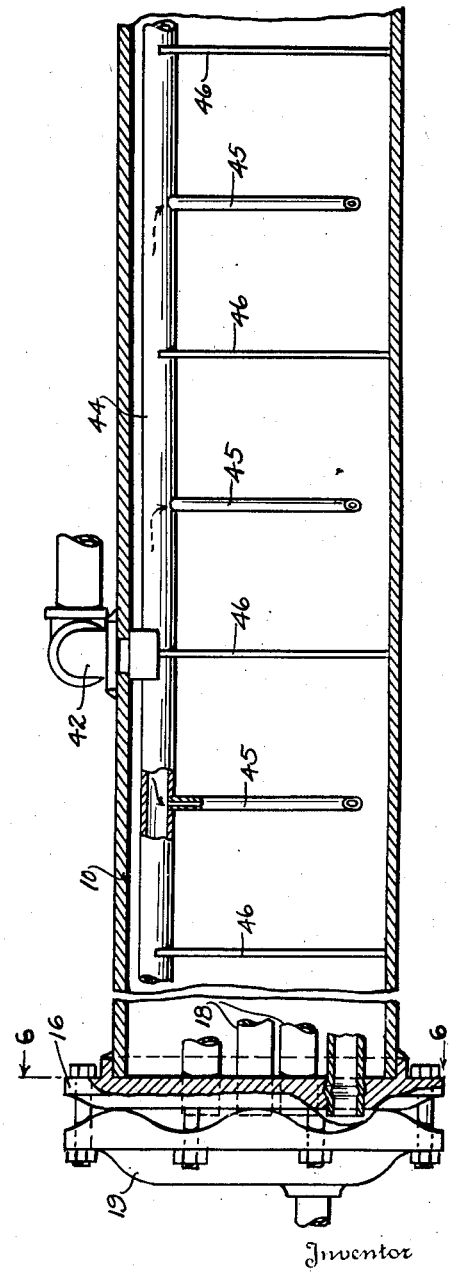
Inventor
LEWIS R. JACKSON
By Mason Fenwick Lawrence
Attorneys May 30, 1933.  L. R. JACKSON  1,911,319
REFRIGERATING APPARATUS
Filed May 18, 1932  4 Sheets-Sheet 4

Inventor
LEWIS R. JACKSON

Patented May 30, 1933

1,911,319

UNITED STATES PATENT OFFICE

LEWIS R. JACKSON, OF LOUISVILLE, KENTUCKY, ASSIGNOR TO HENRY VOGT MACHINE CO., OF LOUISVILLE, KENTUCKY, A CORPORATION OF KENTUCKY

REFRIGERATING APPARATUS

Application filed May 18, 1932. Serial No. 612,085.

This invention relates to water-cooled units, such as absorbers, condensers, and weak liquor coolers, commonly used in absorption type refrigeration systems to recover or reclaim the freezing medium after it has served its purpose of refrigeration.

The main object of the present invention is to construct such units in the form of groups of shell elements connected parallel to valve controlled sources of liquid or gas, whereby any of these shell elements may be separately disconnected from the system, and repaired or replaced during the continued operation of the remaining elements.
Other objects of the invention will become apparent as the detailed description thereof proceeds.

In the drawings:

Figure 1 is a side elevation of an absorber provided with the improvements constituting the present invention;

Figure 2 is a plan view of the absorber shown in Figure 1;

Figure 3 is an end elevation of the absorber shown in Figure 1, parts of the water headers and valve mechanism being removed to show details of construction of other parts;

Figure 8 is a fragmentary horizontal section taken on the line 8—8 of Figure 4 through one of the pipes forming an element of the absorber unit shown in Figures 1 and 2, part of the elements at the end of said pipe being shown in plan view;

Figure 9 is a vertical longitudinal section taken on the line 9—9 of Figure 4 through one of the shell elements of the absorber, part thereof being shown in side elevation;

Figure 12 is a central vertical section through a cap used to seal the ends of the condenser shells illustrated in Figures 10 and 11.

Figure 4:
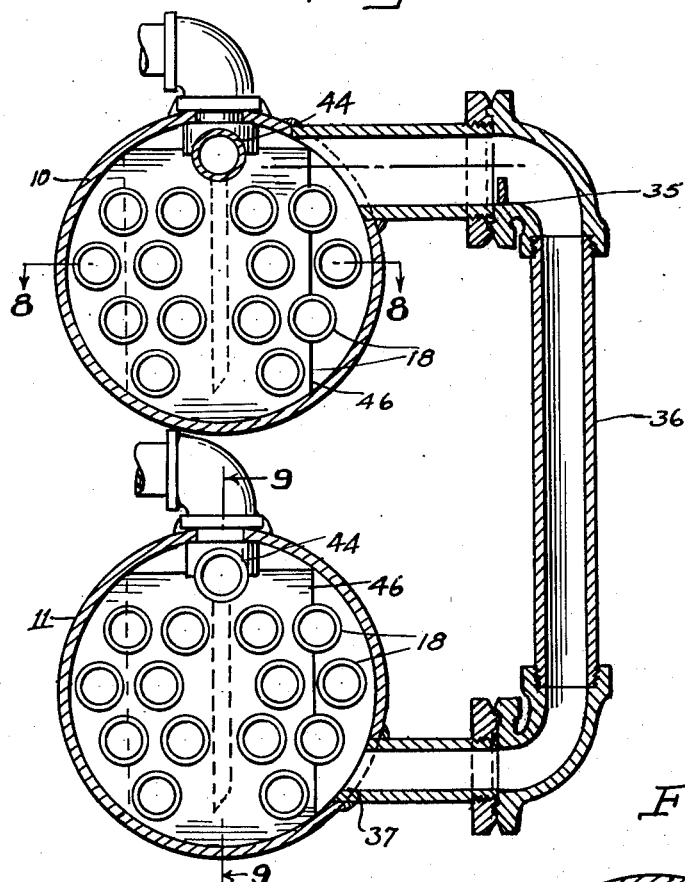
Figure 4 is a vertical transverse section to an enlarged scale, taken on the line 4—4 of Figure 2.

In Figures 1, 2 and 3 of the drawings, the reference numerals 1 and 2 designate base blocks suitably mounted on a floor or platform 3. Channel iron standards 4 and 5 are mounted on the base block 1; and similar standards 6 and 7 are mounted on the block 2. These blocks, with their standards, are spaced apart to support the opposite ends of the stacks 8 and 9 of shell elements forming the main parts of the absorber.

As shown in Figures 1 and 3, the front stack 8 comprises the shells 10, 11, 12, 13, 14 and 15, vertically arranged between the legs of the standards 4 and 6; and held spaced apart by suitable spacing members 16. The number of shells in a stack and the number of stacks will, of course, depend upon the capacity of the plant. Structurally, the shells are identical.

Each shell is closed at its opposite ends by heads 16 and 17; and these heads are bored to receive the opposite ends of cooling tubes 18 which extend through the entire length of the shell and project through the heads. Baffled water caps 19 and 20, detachably secured to the heads 16 and 17, are designed to cause the cooling medium to flow several times back and forth in the shell during its passage between the inlet 21 and the outlet 22 at the other end.

Figure 6:
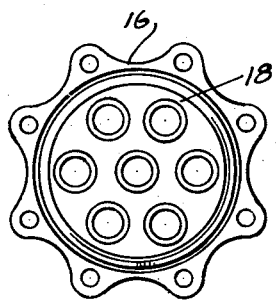
Figure 6 is a vertical transverse section taken on the line 6—6 of Figure 9.
Figure 7:
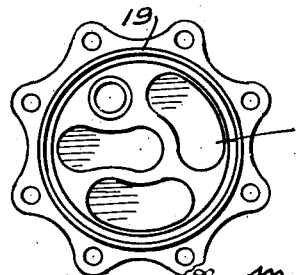
Figure 7 is a vertical transverse section taken on the line 7—7 of Figure 8.

The dimensions of the shell and the number of tubes in each shell will vary also according to the capacity of the plant. As shown in Figures 6 and 7 of the drawings, by way of example, the head 16 is illustrated as having seven tubes supported thereby. The 7-pass baffle cap 19, provided with by-pass recesses 19', causes the water flowing through the tubes from the inlet end 21 to the outlet end 22 to travel seven times the length of the shell before being discharged through the outlet 22.

Figure 5:
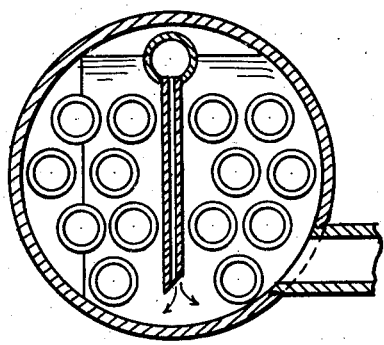
Figure 5 is a vertical transverse section taken on the line 5—5 of Figure 8.

Larger shells will necessarily require a greater number of cooling tubes. In Figures 4 and 5, I have shown the shells as having 14 tubes extending lengthwise therethrough. Whatever the dimensions of the shells and the number of tubes, it is preferable that the number of tubes be a multiple of seven so that the water as a whole will be compelled to travel seven times through the shell before its discharge. For example, a twenty inch shell might have thirty-five tubes mounted therein. In this case, the water heads and baffle caps would be designed to effect seven passes of the cooling water through the shell between the inlet and outlet, with five tubes connected to each end of the by-pass recesses 19′. In Figures 4 and 5 of the drawings, fourteen tubes are illustrated as extending through the shells. Obviously, for a seven pass arrangement there would be two tubes for each pass.

At one end of the stack, shown in Figure 1, a water inlet manifold 23 is supported for connection to a source of water supply. A water header 24 extends vertically upward from the manifold 23 and has a series of globe valves 25 extending laterally therefrom, there being one valve for each shell in the stack 8. Each valve 25 is connected by a short length of pipe 26 to a T-fitting 27, having a plug 28 at one end, connected at its other end to the inlet pipe 21 of the shell.

The stack 9 at the rear of the stack 8 is similarly taken care of by a water header 29 connected in the same manner by globe valves and T-head fittings to the inlet pipes 21 for the shells of the rear stack. The opposite end of the stack 8 is provided at its upper end with an outlet manifold 30, from which depend the outlet water headers 31 and 32. These headers are provided with valve controlled fittings identical in construction with the fittings in the inlet end of the stack; and each shell is provided with its separate outlet control valve. The object of this valve controlled manifold arrangement for the shells is to enable the operator to close off any of the shells and the tubes carried thereby in order to be able to remove any baffle cap 19 and a tube or tubes from any shell, either to repair the same or to replace it, without necessitating the stopping of the operation of the other shell elements of the stack.

The plugs 28 are provided for the purpose of effecting a connection with a source of air under pressure. In some cases, a soft deposit is made on the tube surfaces by the cooling water, and this deposit accumulates considerably in a comparatively short time. The plug 28 avoids the necessity of removing the caps at the opposite ends of a shell where such deposits have occurred. When air is blown in with the water through this plug opening, the soft deposit is usually removed very readily. Of course, where this arrangement is not sufficient to clear the several pipes the heads must be removed.

The valve controlled weak liquor inlet 33 is connected by a pipe 34 to the lower side of the top shell of the stack 8, as is usual of devices of this character. The weak liquor circulates inside the shell and around the cooling tubes between the inlet and the outlet at the top of the other end of the shell. As the weak liquor accumulates in each shell it passes the level of the overflow baffle 35 (see Figure 4), and the excess liquor overflows through a connecting pipe 36 to the inlet 37 at the lower part of the next lower shell. The weak liquor accumulates in the successive shells and flows down through the several pipes 36 at opposite ends of the stack until it emerges, after absorption of gas fed thereto, as strong liquor through the valve controlled pipe 38 connected with the pump out tank 39.

The gas for absorption by the weak liquor, in its passage through the several shells of the stack, is fed into the upper part of each shell from a manifold 40 connected to an equalizing pipe 41 extending upwardly from the pump out tank 39. Each shell has its upper part provided with an elbow fitting 42 connected to a gas header 43 depending from the horizontal manifold 40. The purpose of this manifold and header arrangement is to feed the gas under equal pressure into the upper part of each of the shells of the stack.

In order to insure a thorough absorption of the gas by the weak liquor flowing through the shell and around the cooling tubes, the inner part of each shell is provided with a manifold 44 (see Figures 8 and 9) extending throughout the length of each shell. The manifold 44 has depending therefrom a series of vertical branches 45, each of which feeds the gas to the lower part of the shell. Each shell is provided with baffle plates 46 arranged between the several downwardly extending gas feed pipes 45, so as to force the weak liquor to circulate around the cooling tubes in all directions and thereby cause a turbulence which thoroughly entraps the gas with the water molecules to effect complete absorption.

Figure 11:
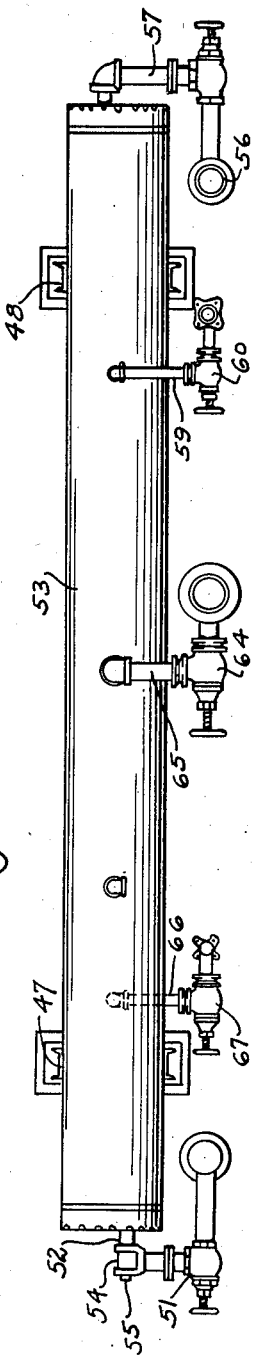
Figure 11 is a plan view of the condenser illustrated in Figure 10.
Figure 10:
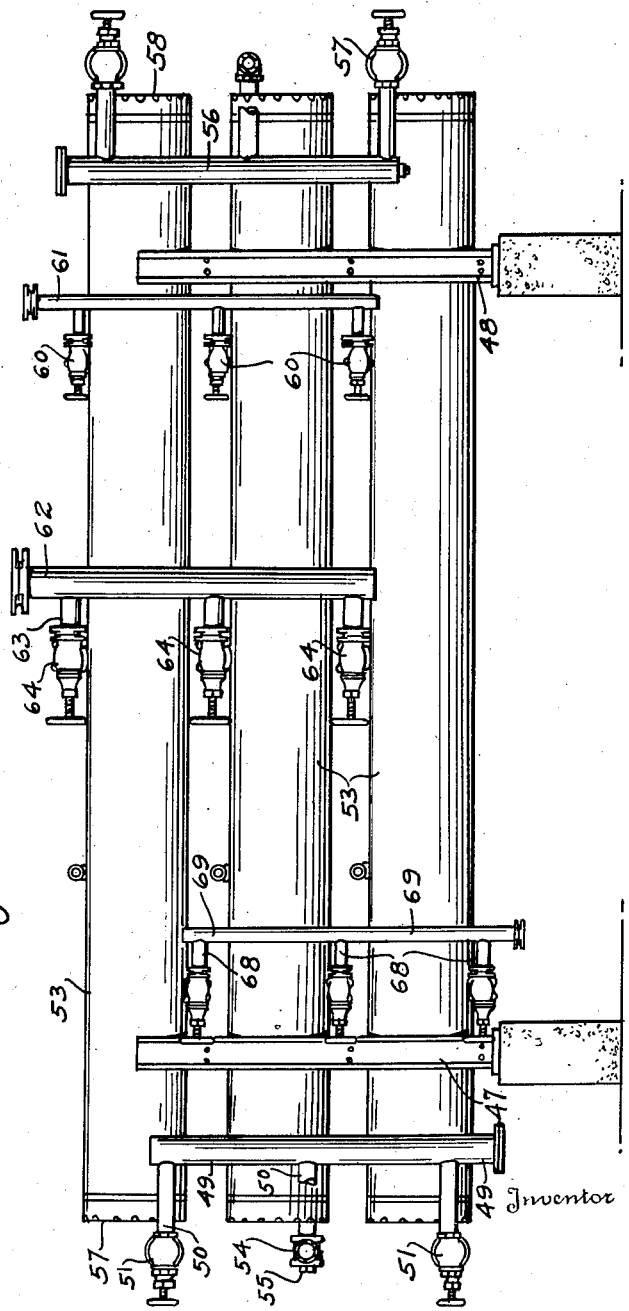
Figure 10 is a side elevation of a condenser having the improvements constituting this invention applied thereto.

The same principle for the water and gas inlets and outlets is applied to the condensers shown in Figures 10 and 11. The condenser stack is shown as comprising three shells arranged vertically on the standards 47 and 48. A water inlet header 49 is provided at one end of the condenser and is connected by the pipes 50 to the valve controlled fittings 51 for conducting the cooling liquid through the pipes 52 to the lower part of each condenser shell 53. The inlet pipe 52 is connected to the usual T-shaped joint 54, provided with a plug 55 for the same reason as a similar plug is provided in the absorber previously described.

The other end of the condenser stack is provided with a water outlet header 56 having a similar valve controlled connection to the upper side of each shell of the stack. It will be understood, of course, that the baffle caps 57 and 58 at the opposite ends of each shell are removable, along with the fittings connected to the control valve, for the purpose of enabling any shell and its tubes to be removed bodily from the stack without necessitating a complete shut down of the other elements of the condenser.

Each of the shells 53 is connected by a pipe 59 to a control valve 60 which in turn is connected to a purge header 61. Gas is admitted to a header 62 having pipes 63 extending therefrom to a control valve 64 connected by pipe 65 to the upper part of each shell. The condensed anhydrous liquid is taken separately from each shell through a pipe 66 which is connected to a valve 67 controlling the flow of liquid through the pipe 68 to the anhydrous liquid header 69 leading to the usual receiver.

The type of baffle cap structure shown in Figures 10, 11 and 12 in connection with the condenser, may be used instead of that shown in Figures 1, 2, 6, 7, 8 and 9. The invention is not particularly concerned with the cap construction, but resides primarily in the provision of the header and valve mechanism for controlling the flow of liquid to and from the tubes of any shell. The principle of the invention is not changed in any way by the particular type of cap and tube header employed.

It will be observed that a common principle runs throughout all these structures. This principle involves the use of water headers connected by valves to the caps of the absorbers, condensers or weak liquid coolers, so that the caps may be removed to permit cleaning or swabbing of the tubes of any shell of these structures. This removal of caps is all that can be done in the case of the absorbers, because the overflows in the absorbers can not be separately disconnected to shut off any shell of the absorber for the purpose of removing any shell or tube of the absorber. The entire stand or stack must be shut down.

The water headers apply to the condenser, absorber and weak liquid cooler of apparatus of this character. Gas headers, purge headers and liquid headers apply to the condenser only, and are applied so as to enable any shell to be shut off from the other parts of the condenser so that any shell and the tubes therein may be separated from a stack for replacement or repair without necessitating the stoppage of other parts of the condenser.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. In refrigerating apparatus, a stack of vertically superposed shells, fluid conducting headers at opposite ends of said stack, separate conduits connecting the opposite ends of said shells to said headers, and a valve in each conduit controlling the flow of fluid therethrough to provide for separation of any of said shells from the stack without stopping the flow of fluid through the remaining shells, a header between the heads of said stack, means for conducting gas from said header to each of said shells, and a valve in each of said means for controlling the flow of gas from said header.

2. In refrigerating apparatus, a stack of vertically superposed shells, headers at opposite ends of said shells, separate conduits connecting the opposite ends of said shells to said headers, a valve in each of said conduits controlling the flow of fluid therethrough, a gas header extending vertically adjacent said stack between the ends thereof, a separate conduit connecting each shell to said gas header, and a valve controlling the flow of fluid through said gas header.

3. In refrigerating apparatus, a shell having a tube bundle arranged therein, means for conducting cooling fluid through the tubes of said bundle, means for conducting weak liquor and gas to the space in said shell surrounding said tubes, and baffle plates extending transversely of said shell to cause turbulence of the weak liquor and gas during their passage through said shell.

4. In refrigerating apparatus, a shell having a tube bundle arranged therein, means for conducting weak liquor to and from the space in said shell surrounding said tube bundle, a header arranged in said shell and extending lengthwise therein, pipes extending downwardly from said header to feed gas from the header to the bottom of said shell, and baffle plates interposed between said pipes to cause turbulence of the weak liquor as it passes through the shell and facilitate absorption of the gas by said liquor.

5. In refrigerating apparatus, a stack of shells, a bundle of tubes in each shell, a header at one end of said stack for conducting cooling fluid to said tubes, a header at the other end of said stack for conducting cooling fluid from said tubes, means for conducting weak liquor and gas to and from the space in each shell surrounding said tubes, and a series of baffle plates arranged in each shell to cause turbulence of the weak liquor and gas during their passage through the shells.

6. In refrigerating apparatus, a shell having a tube bundle therein, means for conducting a gas to said shell, a manifold within the shell connected to said means, a series of pipes depending from said manifold and spaced apart within said shell, and baffle plates separating adjacent manifolds from each other.

7. In refrigerating apparatus, a shell having a tube bundle therein, a manifold extending lengthwise within said shell, means for feeding gas to said manifold, pipes connected to said manifold for conducting gas to the opposite side of said shell, a series of baffle plates alternating with said pipes within said shell, and means for feeding weak liquor to said shell.

8. In refrigerating apparatus, a stack of vertically superposed shells, a tube bundle in each of said shells, means for feeding a gas to each shell, a valve for controlling said means, and means for equalizing the pressure of the gas as it is fed to said shell.

9. In a refrigerating apparatus, a shell, a tube bundle mounted in said shell, means for conducting a cooling fluid to and from the tubes of said bundle, and valves controlling the operation of said means, said means including a part adapted for connection to air under pressure.

10. In refrigerating apparatus, a stack of shells, headers at opposite ends of said stack, conduits connecting said headers to each of said shells, and means in the conduits connected to one of said headers for subjecting each shell to air under pressure.

11. In refrigerating apparatus, a stack of vertically superposed shells, a tube bundle in each shell, baffle caps connected to opposite ends of said shells, headers at opposite ends of said stacks, conduits connecting said headers to each of said shells, and a valve in each conduit, each of said caps and parts of the conduits connected thereto being detachable bodily from the shells and valves.

12. In refrigerating apparatus, a stack of vertically superposed shells, a tube bundle in each shell, caps detachably connected to opposite ends of each shell, headers for conducting a cooling medium to and from said shells, valve controlled conduits detachably connected in parallel to said caps, headers for conducting fluids to and from said stack, and valve controlled conduits connected in parallel to said shells between the ends thereof.

13. In refrigerating apparatus, a stack of vertically disposed shells, a tube bundle in each shell, means for conducting cooling fluid to and from said tube bundles, means for conducting fluids to and from the space in said shells surrounding the tubes of said bundles, and valves controlling the flow of said fluids through each of said means separately to permit separation of any of said shells with the bundle therein, during the continued operation of the remaining parts of the apparatus.

In testimony whereof I affix my signature.

LEWIS R. JACKSON.